(12) United States Patent
Nam et al.

(10) Patent No.: US 9,612,704 B2
(45) Date of Patent: Apr. 4, 2017

(54) APPARATUS AND METHOD FOR SENSING TOUCH

(71) Applicant: MELFAS INC., Seongnam-Si, Gyeonggi-do (KR)

(72) Inventors: Sungil Nam, Seoul (KR); Yuntae Kim, Uiwang-si (KR)

(73) Assignee: MELFAS INC., Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/654,829

(22) PCT Filed: Dec. 18, 2013

(86) PCT No.: PCT/KR2013/011774
§ 371 (c)(1),
(2) Date: Jun. 22, 2015

(87) PCT Pub. No.: WO2014/104642
PCT Pub. Date: Jul. 3, 2014

(65) Prior Publication Data
US 2015/0338971 A1    Nov. 26, 2015

(30) Foreign Application Priority Data

Dec. 27, 2012  (KR) .......................... 10-2012-0154792

(51) Int. Cl.
*G06F 3/045* (2006.01)
*G06F 3/047* (2006.01)
(Continued)

(52) U.S. Cl.
CPC .............. *G06F 3/047* (2013.01); *G06F 3/044* (2013.01); *G06F 3/0416* (2013.01); *G09G 5/003* (2013.01);
(Continued)

(58) Field of Classification Search
CPC . G06F 3/044; G06F 3/047; G09G 2300/0426; G09G 5/18; G09G 5/003
(Continued)

(56) References Cited

U.S. PATENT DOCUMENTS 8,194,049 B2   6/2012 Oki
9,377,882 B2 * 6/2016 Kim ........................ G06F 3/038
(Continued)

FOREIGN PATENT DOCUMENTS

| JP | 2011-100215 A | 5/2011 |
| JP | 2012-43275 A | 3/2012 |
| WO | WO 2008/093683 A1 | 8/2008 |

OTHER PUBLICATIONS

Patent Cooperation Treaty, International Search Report, International Patent Application No. PCT/KR2013/011774, Apr. 1, 2014, 5 Pages (with English translation).

*Primary Examiner* — Prabodh M Dharia
(74) *Attorney, Agent, or Firm* — Fenwick & West LLP (57) ABSTRACT

A touch sensing apparatus includes: a touch screen panel including a plurality of first electrodes formed along a first direction and a plurality of second electrodes formed along a second direction intersecting the first direction; and a controller sequentially applying a driving signal to either the plurality of first electrodes or the plurality of second electrodes, receiving a detection signal from the plurality of second electrodes while applying the driving signal to the plurality of first electrodes, and receiving a detection signal from the plurality of first electrodes while applying the driving signal to the plurality of second electrodes, wherein the controller changes electrodes to which the driving signal is to be applied for each preset cycle of a touch sensing operation.

8 Claims, 5 Drawing Sheets

(51) Int. Cl.
*G09G 5/18* (2006.01)
*G09G 5/00* (2006.01)
*G06F 3/044* (2006.01)
*G06F 3/041* (2006.01)

(52) U.S. Cl.
CPC ....... *G09G 5/18* (2013.01); *G09G 2300/0426* (2013.01)

(58) Field of Classification Search
USPC ................ 345/104, 156–184; 340/407.2
See application file for complete search history.

(56) References Cited

U.S. PATENT DOCUMENTS

| | | | |
|---|---|---|---|
| 2007/0062739 A1* | 3/2007 | Philipp | G06F 3/044 178/18.06 |
| 2007/0070047 A1* | 3/2007 | Jeon | G06F 3/0412 345/173 |
| 2008/0316182 A1* | 12/2008 | Antila | G06F 3/044 345/173 |
| 2009/0284496 A1 | 11/2009 | Oki | |
| 2010/0182278 A1* | 7/2010 | Li | G06F 3/0416 345/174 |
| 2011/0063243 A1* | 3/2011 | Kim | G06F 3/0412 345/174 |
| 2011/0115717 A1* | 5/2011 | Hable | G06F 3/0416 345/173 |
| 2011/0141040 A1* | 6/2011 | Kang | G06F 3/0412 345/173 |
| 2011/0199333 A1* | 8/2011 | Philipp | G06F 3/044 345/174 |
| 2011/0227863 A1* | 9/2011 | Cheng | G06F 3/044 345/174 |
| 2012/0019474 A1* | 1/2012 | Hsieh | G06F 3/044 345/174 |
| 2012/0044013 A1 | 2/2012 | Muranaka | |
| 2012/0262410 A1* | 10/2012 | Lim | G06F 3/044 345/174 |
| 2013/0009905 A1* | 1/2013 | Castillo | G06F 3/044 345/174 |
| 2013/0016057 A1* | 1/2013 | Nishimura | G06F 3/0416 345/173 |
| 2013/0050130 A1* | 2/2013 | Brown | G06F 3/044 345/174 |
| 2013/0321290 A1* | 12/2013 | Oh | G06F 3/0416 345/173 |
| 2014/0062907 A1* | 3/2014 | Kim | G06F 3/038 345/173 |
| 2014/0111474 A1* | 4/2014 | Bytheway | G06F 3/044 345/174 |
| 2014/0248732 A1* | 9/2014 | Kim | G06F 3/0412 438/50 |

* cited by examiner

FIG. 1

(PRIOR ART)

FIG. 2

(PRIOR ART)

FIG. 3A

(PRIOR ART)

FIG. 3B (PRIOR ART)

APPARATUS AND METHOD FOR SENSING TOUCH

TECHNICAL FIELD

Embodiments of the inventive concepts described herein relate to a capacitive touch sensing apparatus and a method thereof.

BACKGROUND ART

A touch sensing apparatus is an input apparatus which is located on a front surface of a display device or in the display device to detect a finger or a person or a position of an object, which is in direct contact with or is close to a screen of the display device.

Since the touch sensing apparatus allows a user to directly touch an object displayed on the screen to perform input, it may provide a more intuitive input interface to the user and may be replaced with an input means, such as a keyboard or a mouth, which additionally connect to a display device to operate. Therefore, a use range is on a trend of being expanded in various ways.

In general, types for implementing a touch sensing apparatus are a resistive type, an optical sensing type, a capacitive type, and the like. Since the capacitive type has advantages such as ease of multi-touch sensing, a fast response speed, and excellent durability, it is recently applied to various devices.

A capacitive touch sensing apparatus may be classified as a technique of determining contact input using self-capacitance generated between a contact object and electrodes without applying a separate driving signal or a technique of being configured with two electrode layers including driving electrodes and sensing electrodes and determining contact input using a change in mutual-capacitance between driving electrodes and sensing electrodes, which is generated by contact of a contact object.

While the technique using self-capacitance is simple in circuit composition and is easy in implementation, it has a disadvantage of determining a multi-touch. The technique using mutual-capacitance has an advantage as compared with the technique using itself-capacitance in determining a multi-touch, whereas driving electrodes and sensing electrodes should be separately formed to sense touch positions.

Figure 1:
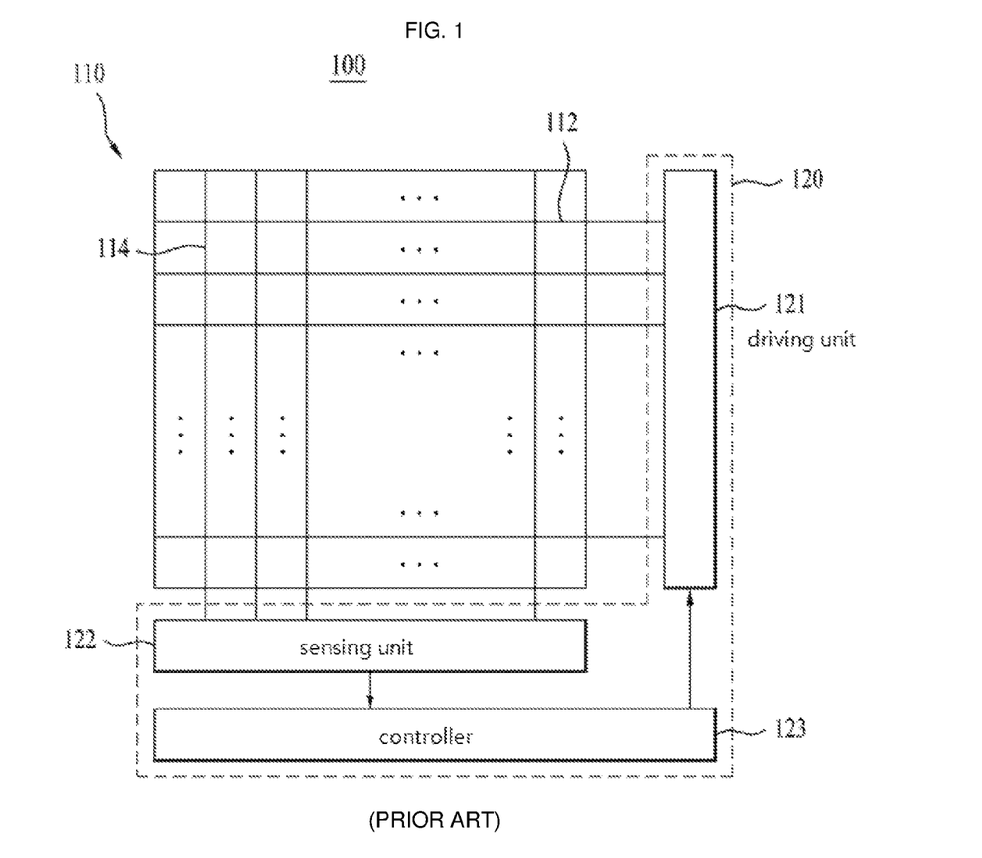
FIG. 1 is a drawing illustrating a configuration of a typical mutual-capacitive touch sensing apparatus.

FIG. 1 is a drawing illustrating a configuration of a typical mutual-capacitive touch sensing apparatus. A typical mutual-capacitive touch sensing apparatus 100 includes a touch screen panel 110 including a plurality of first electrodes 112 formed along a first direction and a plurality of second electrodes 114 formed along a second direction intersecting the first electrodes 112, a driving unit 121 which sequentially applies a driving signal to the first electrodes 112, a sensing unit 122 which receives a change in capacitance from the second electrodes 114 and applies a detection signal to a controller 123, and the controller 123 which receives the detection signal from the sensing unit 122 and determines a detected touch position.

The first electrodes 112 operate as driving electrodes, and the second electrodes 114 operate as sensing electrodes. Driving electrodes 112 and sensing electrodes 114 may be formed on different layers or the same layer, and may be alternately disposed to be insulated to each other and be close to each other while not being overlapped with each other.

Figure 2:
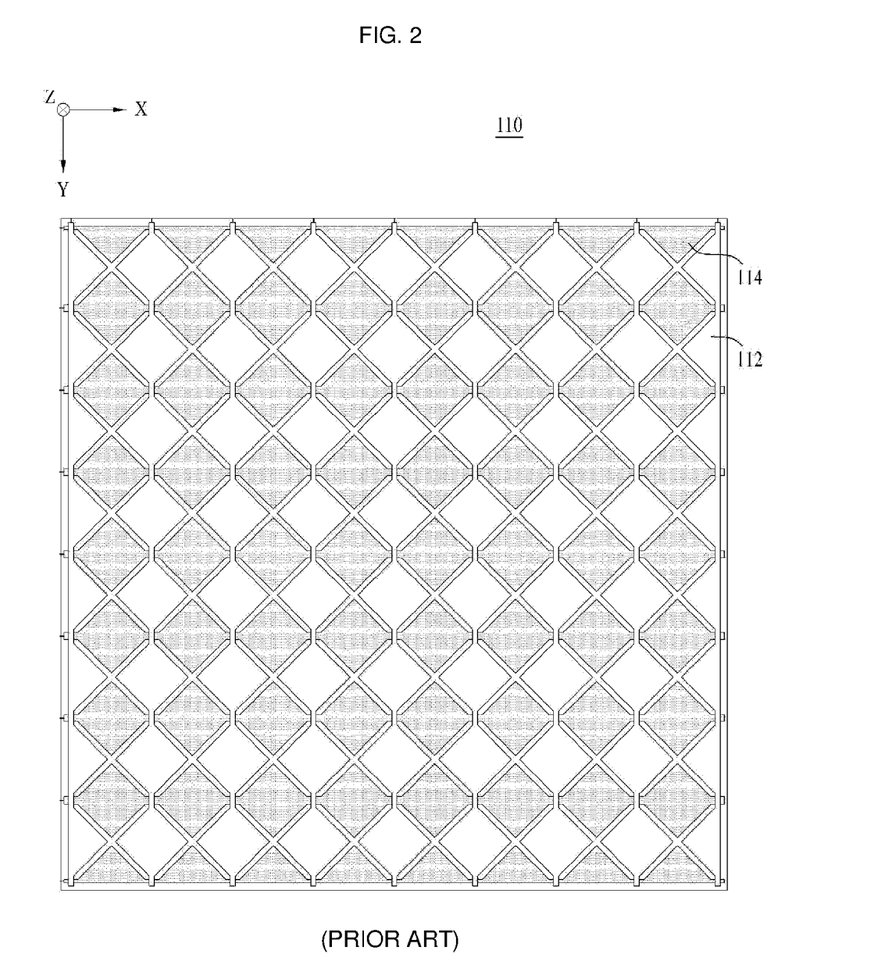
FIG. 2 is a drawing illustrating a touch screen panel.

FIG. 2 is a drawing illustrating an electrode structure of a typical touch screen panel.

For example, as shown in FIG. 2, driving electrodes 112 and sensing electrodes 114 may be formed to be close to each other in a regular pattern such as a diamond pattern. Also, since short circuits occurs in intersections of the driving electrodes 112 and the sensing electrodes 114 when the driving electrodes 112 and the sensing electrodes 114 are formed on the same layer, driving electrodes 112 or sensing electrodes 114 which are arranged on the same line connect through bridges (now shown) formed in different layers. Short circuits are prevented from occurring in connecting portions of intersected sensing electrodes 114 and driving electrodes 112.

Mutual-capacitance is formed between adjacent driving electrodes and sensing electrodes which intersect each other by the arrangement of the driving electrodes 112 and the sensing electrodes 114. Each of driving electrodes 112 and each of sensing electrodes 114 in which mutual-capacitance is formed play a role as each sensing cell for implementing touch recognition.

When a driving signal is applied from the driving unit 121 to a driving electrode 112 included in the sensing cell, a coupled detection signal is generated to a sensing electrode 114 included in the sensing cell by mutual-capacitance formed at the sensing cell.

When a driving signal is applied to a driving electrode 112 connected to each sensing cell, mutual-capacitance formed at each sensing cell is sensed through a sensing electrode 114 connected with each sensing cell.

Therefore, the driving electrode 112 to which the driving signal is applied and a plurality of adjacent sensing electrodes 114 intersecting the driving electrode 112 are configured as respective sensing cells, and mutual-capacitance is formed for each sensing cell. When there is no conductive object (a finger or a stylus) which is close to a sensing cell, there is no change in mutual capacitance (CM) formed at the sensing cell. When the conductive object is close to or in contact with a sensing cell, there is a change in mutual-capacitance. Consequently, this change leads to changing current (and/or voltage) carried to a sensing electrode 114 connected to the sensing cell.

The sensing unit 122 connected with the sensing electrodes 114 converts the change in capacitance and information (detection signal) about a position of a sensing cell into a certain format through an analog-to-digital converter (ADC) (not shown) and transmits the converted information to the controller 123. The controller 123 calculates a touch input position using this information.

Figure 3A:
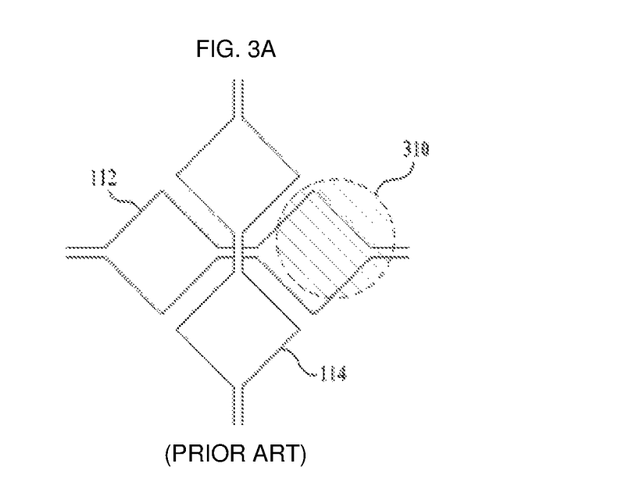
FIG. 3 is a drawing illustrating a touch input region when touch input occurs for each electrode in a conventional touch sensing apparatus.
Figure 3B:
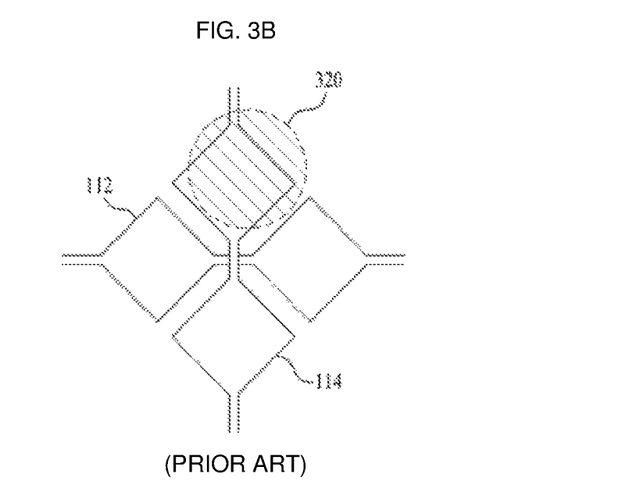

Meanwhile, this mutual-capacitive touch sensing apparatus has a problem in that touch sensitivity is not kept constant in its structure according to a touch input position and a position in which each electrode is formed. FIG. 3 is a drawing illustrating a touch input region when touch input occurs on each electrode in a conventional touch sensing apparatus. Referring to FIG. 3, for example, as shown in (a) of FIG. 3, comparing sensitivity of a touch input 310 when touch input mainly occurs on a driving electrode 112 with sensitivity of a touch input 320 when touch input mainly occurs, as shown in (b) of FIG. 3, on a sensing electrode 114, the sensitivity of the touch input 320 which occurs on the sensing electrode 114 is detected to be relatively higher than that of the touch input 310 which occurs on the driving electrode 112. This is because the controller 123 receives a change in capacitance from the sensing electrodes 114. Due to this difference, there may be an error in that input sensitivity differs in a plurality of touch input of the same degree. There may be a problem in linearity of touch input.

DISCLOSURE

Technical Problem

Embodiments of the inventive concepts provide a touch sensing apparatus for recognizing similar sensitivity although touch input of the same degree occurs on any portion of a touch screen panel and a method thereof.

Technical Solution

One aspect of embodiments of the inventive concept is directed to provide a touch sensing apparatus. The touch sensing apparatus may include a touch screen panel configured to include a plurality of first electrodes formed along a first direction and a plurality of second electrodes formed along a second direction intersecting the first direction and a controller configured to sequentially apply a driving signal to the plurality of first electrodes or the plurality of second electrodes, to receive a detection signal from the plurality of second electrodes while applying the driving signal to the plurality of first electrodes, and to receive a detection signal from the plurality of first electrodes while applying the driving signal to the plurality of second electrodes, wherein the controller changes electrodes to which the driving signal is to be applied for each preset cycle of a touch sensing operation.

The controller may determine whether a touch input occurs and a touch input location using a detection signal from the plurality of first electrodes or the plurality of second electrodes for each cycle.

The controller may determine whether a touch input occurs and a touch input location using detection signals from the plurality of first electrodes or the plurality of second electrodes of two cycles.

The controller may determine whether a touch input occurs and a touch input location using an average value or a weighted average value of the detection signals from the plurality of first electrodes or the plurality of second electrodes of the two cycles.

The touch sensing apparatus may further include a first driving and sensing unit configured to apply a driving signal to the plurality of first electrodes or to receive a detection signal from the plurality of first electrodes according to an operation signal of the controller and a second driving and sensing unit configured to apply a driving signal to the plurality of second electrodes or to receive a detection signal from the plurality of second electrodes according to an operation signal of the controller.

The preset cycle may be an operation period in which a driving signal is applied to each of the plurality of first electrodes or each of the plurality of second electrodes once.

The preset cycle may be an operation period in which a driving signal is applied to each of the plurality of first electrodes or each of the plurality of second electrodes twice or more.

The plurality of first electrodes and the plurality of second electrodes may be formed of indium-tin-oxide (ITO), indium-zinc-oxide (IZO), metal mesh, graphene, silver nano wire, or carbon nano tube (CNT).

The plurality of first electrodes and the plurality of second electrodes may be formed on the same layer.

Another aspect of embodiments of the inventive concept is directed to provide a touch sensing method. The touch sensing method may include sequentially applying a driving signal to a plurality of first electrodes formed along a first direction and receiving a detection signal from a plurality of second electrodes formed along a second direction intersecting the first direction, during a preset first cycle, determining whether a touch input occurs and a touch input location using the detection signal from the plurality of second electrodes, sequentially applying a driving signal to the plurality of second electrodes and receiving a detection signal from the plurality of first electrodes, during a preset second cycle, and determining whether a touch input occurs and a touch input location using the detection signal from the plurality of first electrodes.

Each of the preset first cycle and the preset second cycle may be an operation period in which a driving signal is applied to each of the first electrodes or each of the plurality of second electrodes once.

Each of the preset first cycle and the preset second cycle may be an operation period in which a driving signal is applied to each of the first electrodes or each of the plurality of second electrodes twice or more.

Another aspect of embodiments of the inventive concept is directed to provide a touch sensing method. The touch sensing method may include sequentially applying a driving signal to a plurality of first electrodes formed along a first direction and receiving a detection signal from a plurality of second electrodes formed along a second direction intersecting the first direction, during a preset first cycle, sequentially applying a driving signal to the plurality of second electrodes and receiving a detection signal from the plurality of first electrodes, during a preset second cycle, and determining whether a touch input occurs and a touch input location using the detection signal from the plurality of second electrodes during the first cycle and the detection signal from the plurality of first electrodes during the second cycle.

The determining of whether the touch input occurs and the touch input location using the detection signal from the plurality of second electrodes during the first cycle and the detection signal from the plurality of first electrodes during the second cycle may include determining whether a touch input occurs and a touch input location using an average value or a weighted average value of the detection signal from the plurality of second electrodes during the first cycle and the detection signal from the plurality of first electrodes during the second cycle.

Each of the preset first cycle and the preset second cycle may be an operation period in which a driving signal is applied to each of the first electrodes or each of the plurality of second electrodes once.

Each of the preset first cycle and the preset second cycle may be an operation period in which a driving signal is applied to each of the first electrodes or each of the plurality of second electrodes twice or more.

Advantageous Effects

Respective electrodes alternately play a role as a driving electrode and a sensing electrode for each cycle of a touch recognition operation without fixing each electrode set to a driving electrode and a sensing electrode, thus obtaining a certain touch input sensitivity level although touch input occurs on any electrode region. Therefore, an error which occurs for each touch position is reduced to improve overall touch input sensitivity of the touch sensing apparatus. Linearity is improved so that the entire performance of the touch sensing apparatus may be consequently enhanced.

BEST MODE

Exemplary embodiments of the inventive concept will be described more fully hereinafter with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Also, in describing the inventive concept, when a detailed description for known technologies associated with the inventive concept makes the subject matter of the inventive concept unclear, it is omitted.

BEST MODE

The same reference denotations are used for the same or similar components throughout the present specification. Also, in the drawings, for convenience of description, the size and thickness of each composition is shown as, but is not limited to, a value. In the drawings, layers and regions are exaggerated for clarity.

Also, when a portion such as a layer, a film, a region, and a plate is referred to as being placed "above" or "on" another portion, this includes when the portion is placed "immediately above" the other portion and when another portion is present therebetween. In contrast, when a portion is referred to as being placed "immediately above" another portion, there is no intervening portion.

The inventive concept provides a touch sensing apparatus for addressing a problem in which there is different input sensitivity according as a touch input region is mainly formed on any electrode region and a method thereof. Therefore, according to features of the inventive concept, respective electrodes alternately play a role as a driving electrode and a sensing electrode for each cycle of a touch sensing operation without fixing each electrode set to a driving electrode and a sensing electrode. Due to this operation, in the inventive concept, a touch recognition degree may be kept constant in all regions of a touch screen panel when there is the same touch input. These features of the inventive concept are described with reference to the accompanying drawings.

Figure 4:
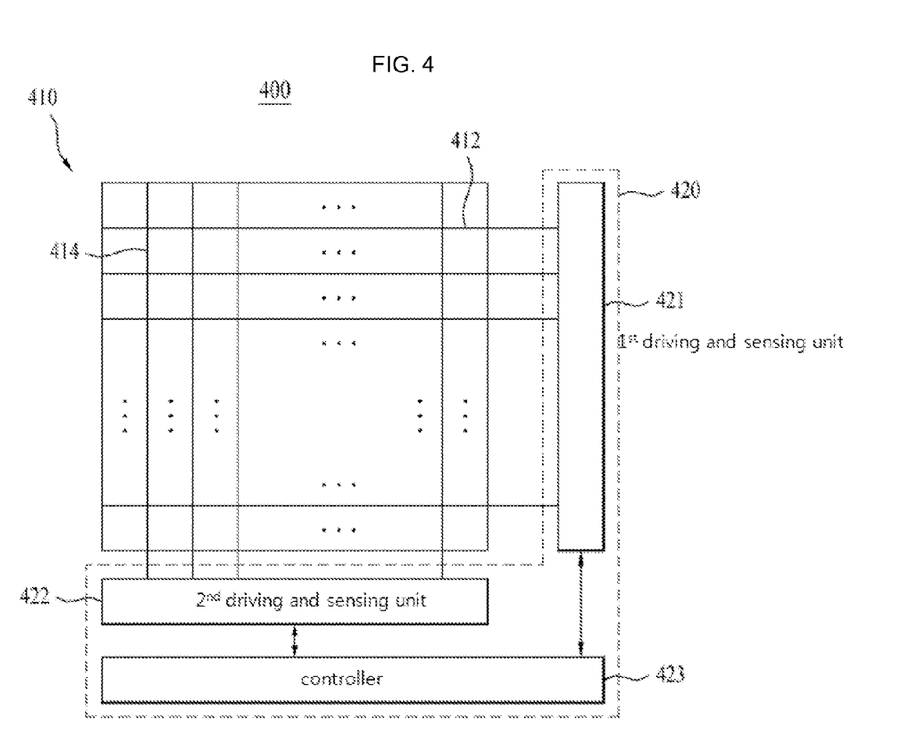
FIG. 4 is a drawing illustrating a configuration of a touch sensing apparatus according to an exemplary embodiment of the inventive concept.

FIG. 4 is a drawing illustrating a configuration of a touch sensing apparatus according to an exemplary embodiment of the inventive concept. A touch sensing apparatus 400 according to an exemplary embodiment of the inventive concept a touch screen panel 410 which includes a plurality of first electrodes 412 formed along a first direction and a plurality of second electrodes 414 formed along a second direction intersecting the first electrodes 412, a first driving and sensing unit 421 which sequentially applies a driving signal to the first electrodes 412 or receives a change in capacitance from the first electrodes 412 according to an operation signal from a controller 423 described below, a second driving and sensing unit 422 which sequentially applies a driving signal to the second electrodes 422 or receives a change in capacitance from the second electrodes 422 according to an operation signal from the controller 423, and the controller 423 which receives a detection signal from the first driving and sensing unit 421 or the second driving and sensing unit 422 and determines a detected touch position.

The first driving and sensing unit 421, the second driving and sensing unit 422, and the controller 423 may be implemented with one chipset or processor such as a touch controller integrated circuit (IC) 420, and may be implemented to be included a display controller such as a display driver IC (DDI) (not shown).

The controller 423 may sequentially apply a driving signal to the plurality of first electrodes 412 and the plurality of second electrodes 414. The controller 423 may receive a detection signal from the plurality of second electrodes 414 while applying the driving signal to the plurality of first electrodes 412. The controller 423 may receive a detection signal from the plurality of first electrodes 412 while applying the driving signal to the plurality of second electrodes 414. The controller 423 may change electrodes to which the driving signal is to be applied for each preset cycle of a touch sensing operation.

In a typical touch sensing apparatus, a first electrode and a second electrode may play a role as a driving electrode and a sensing electrode in a fixed way, respectively. In contrast, the first electrode may operate as a sensing electrode, and the second electrode may operate as a driving electrode.

However, in the inventive concept, a touch sensing operation may be divided into preset cycles. In a cycle, a first electrode may operate as a driving electrode and a second electrode may operate as a sensing electrode. In a next cycle, the first electrode may operate as a sensing electrode and the second electrode may operate a driving electrode. The change of an operation between these electrodes may be performed by an operation signal of the controller 423.

Also, periods and conditions in which roles of respective electrodes are changed from each other may be set in various ways. For example, when the first electrodes 412 operate as driving electrodes, the first driving and sensing unit 421 may sequentially apply a driving signal to each of the first electrodes 412. After applying a driving signal to all the first electrodes 412 once, the first driving and sensing unit 421 may change the first electrodes 412 to play a role as sensing electrodes. In this case, when a driving signal is applied to the first electrodes 412, the second driving and sensing unit 422 may receive a change in mutual-capacitance through the second electrodes 414. When the first electrodes 412 are changed to sensing electrodes, the second electrodes 414 are changed to play a role as driving electrodes. In this case, one operation cycle may be an operation period in which a driving signal is applied to a plurality of first electrodes or a plurality of second electrodes once.

Meanwhile, after a driving signal is applied to one electrode twice or more, it may be set to change a role of the electrode. For example, after a driving signal is sequentially applied to the first electrodes 412 twice, it may be set to change a role of the first electrodes 412. In this case, one operation cycle may be an operation period in which a driving signal is applied to a plurality of first electrodes or a plurality of second electrodes twice or more.

Meanwhile, the first electrodes 412 and the second electrodes 414 may be preferably formed on the same layer and may be alternately disposed to be insulated with each other and be close to each other while not being overlapped with each other. Meanwhile, the first electrodes 412 and the second electrodes 414 may be formed on different layers.

The first electrodes 412 and the second electrodes 414 may be formed on the same layer, for example, in a regular pattern such as a diamond pattern. Herein, this is one exemplary embodiment of the inventive concept, and shapes of the electrodes are not limited to diamond shapes. The first electrodes 412 and the second electrodes 414 may be implemented with various shapes which are close to each other.

Also, when the first electrodes 412 and the second electrodes 414 are formed on the same layer, since short circuits occur in intersections of the first electrodes 412 and the second electrodes 414, first electrodes 412 or second electrodes 414, which are arranged on the same line, may connect through bridges (not shown) formed on different layers. Short circuits are prevented from occurring in connecting portions of intersected first electrodes 414 and second electrodes 412.

It is preferable that the plurality of first electrodes 412 and the plurality of second electrodes 414 are implemented with a transparent conductive material. The transparent conductive material may be formed of indium-tin-oxide (ITO), indium-zinc-oxide (IZO), metal mesh, graphene, silver nano wire, carbon nano tube (CNT), and the like.

Mutual-capacitance is formed between adjacent first electrodes 412 and second electrodes 414 which intersect each other by the arrangement of the first electrodes 412 and the second electrodes 414. Each of the first electrodes 412 and each of the second electrodes 414 in which mutual-capacitance is formed may play a role as each of sensing cells which implement touch recognition Herein, when a driving signal is applied from the first and second driving and sensing units 421 and 422 to a driving electrode included in the sensing cell, a coupled sensing signal is generated to a sensing electrode 114 included in the sensing cell by mutual-capacitance formed at the sensing cell.

In other words, when a driving signal is applied to a driving electrode connected to each sensing cell, mutual-capacitance formed at each sensing cell may be sensed through a sensing electrode connected with each sensing cell.

Also, when the first and second driving and sensing units 421 and 422 apply a driving signal to one of driving electrodes, the other driving electrodes keep a ground state.

Therefore, the driving electrode to which the driving signal is applied and a plurality of adjacent sensing electrodes intersecting the driving electrode may be configured as respective sensing cells, and mutual-capacitance is formed for each sensing cell. When a conductive object, for example, a finger is in contact with each sensing cell, a change in capacitance occurs in the corresponding sensing cell.

As described above, a driving electrode and an adjacent sensing electrode intersecting the driving electrode may be configured as a sensing cell. When there is no conductive object (a finger or a stylus) which is close to a sensing cell, there is no change in mutual-capacitance (CM) formed at the sensing cell. When the conductive object is close to or in contact with a sensing cell, a change in mutual-capacitance occurs. Consequently, this change results in changing current (and/or voltage) carried to a sensing electrode connected to the sensing cell.

Accordingly, the first and second driving and sensing units 421 and 422 connected with the sensing electrode may convert the change in capacitance and information (sensing signal) about a position of the sensing cell into a certain format through an ADC (not shown) and may transmit the converted information to the controller 423.

A method of detecting a position of the sensing cell in which the change in capacitance occurs according to an exemplary embodiment of the inventive concept is described as follows. When sensing a change in capacitance of a sensing electrode connected to a sensing cell, the first and second driving sensing units 421 and 422 may output a coordinate of the sensing electrode in which the change in capacitance occurs, that is, a coordinate of a sensing electrode included in a sensing cell connected with a driving electrode and a coordinate of a driving electrode to which a driving signal is input from the first and second driving and sensing units 421 and 422 to obtain a coordinate of at least one contacted sensing cell.

One of the first and second driving and sensing units 421 and 422, which operates as a driving unit, may scan driving electrodes (may sequentially apply a driving signal to driving electrodes) and may simultaneously and continuously output coordinates of the scanned driving electrodes to the other of the first and second driving and sensing units 421 and 422, which operates as a sensing unit. The other of the first and second driving and sensing units 421 and 422, which operates as the sensing unit, may sense a change in capacitance with respect to a sensing electrode and may simultaneously obtain a point in which the change in capacitance occurs, that is, a position coordinate of a driving electronic and a sensing electrode which are included in a sensing cell. The touch sensing apparatus according to an exemplary embodiment of the inventive concept may implement recognition for a plurality of contact points, that is, multi-touch recognition by the above-described configuration.

Meanwhile, a touch input detection operation may be performed in the same way as a conventional way while continuously changing a role of each electrode for each cycle in which a driving signal is applied. However, the touch input detection operation may be performed to calculate a touch input coordinate in consideration of touch detection results of two cycles together. For example, a detection signal value (a change value in capacitance or a current/voltage change value due to the change value) in a first cycle and a detection signal value in a second cycle may be averaged to calculate whether a touch input occurs and touch input coordinates in the sum of the two cycles. In this case, computation methods, such as averaging, adding, or calculating the weighted average of a sensing signal from each of two electrode sets, may be also used.

Since touch input is determined using a detection signal from each of the two electrode sets, a more accurately touch input position may be calculated.

Figure 5:
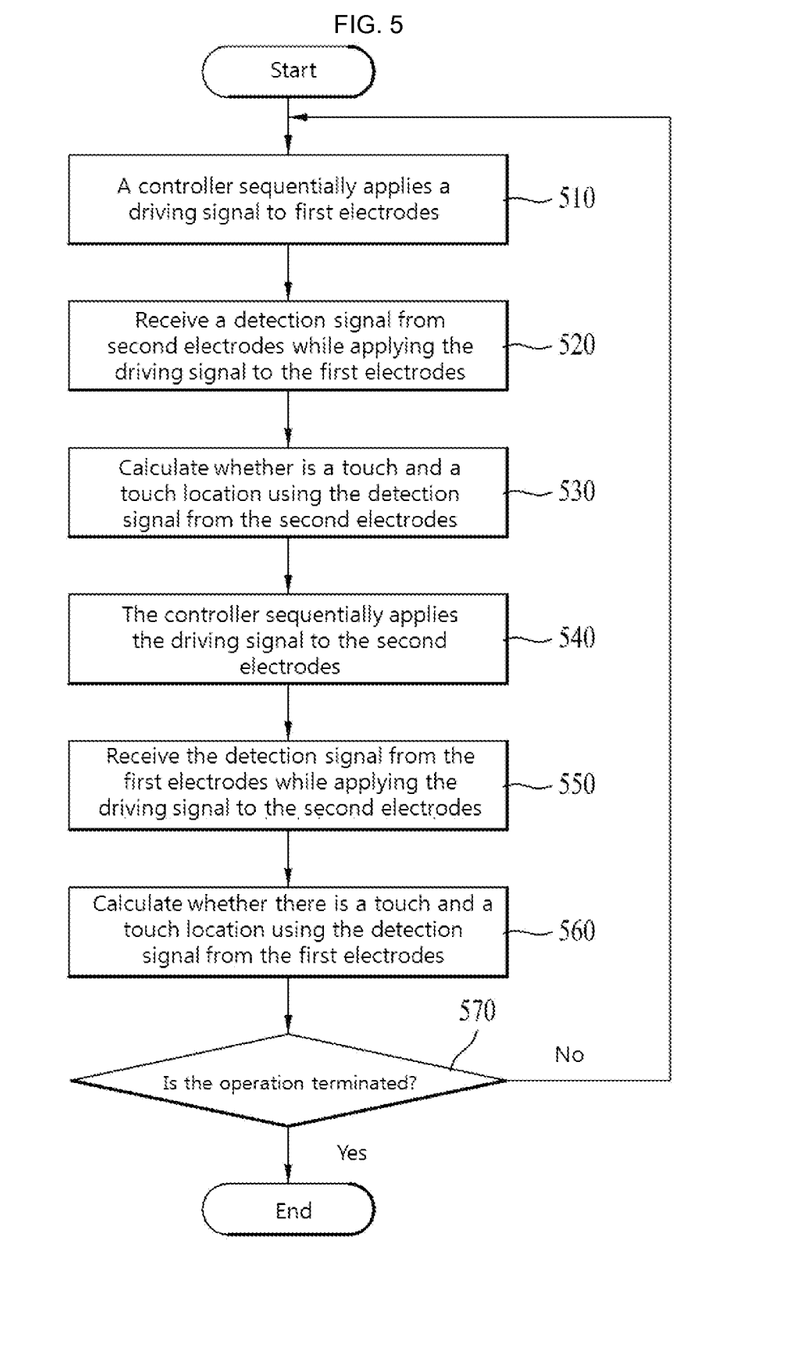
FIG. 5 is a flowchart illustrating a touch sensing method according to an exemplary embodiment of the inventive concept.

FIG. 5 is a flowchart illustrating a touch sensing method according to an exemplary embodiment of the inventive concept. FIG. 5 illustrates a touch sensing operation when an operation of sequentially applying a driving signal to one electrode set once is set to one operation cycle for touch sensing.

Referring to FIG. 5, in a touch sensing operation according to an exemplary embodiment of the inventive concept, in step 510, a controller 423 may sequentially apply a driving signal to first electrodes 412 through a first driving and sensing unit 421. In step 520, the controller 423 may receive a detection signal value (a change in mutual-capacitance) from second electrodes 414 while applying a driving signal to the first electrodes 412 through a second driving and sensing unit 422. In step 540, the controller 423 may calculate whether a touch input occurs and a touch input location using the detection signal value from the second electrodes 414.

In step 540, the controller 423 may sequentially apply a driving signal to the second electrodes 414 through the second driving and sensing unit 422. In step 550, the controller 423 may receive a detection signal value from the first electrodes 412 while applying a driving signal to the second electrodes 414 through the first driving and sensing unit 421. In step 560, the controller 423 may calculate whether a touch input occurs and a touch input location using the detection signal value from the first electrodes 412. Thereafter, in step 570, the controller 423 may determine whether the operation is terminated and may terminate the operation. When the operation is not terminated, the controller 423 may proceed to step 510 and may perform a touch sensing operation again.

When the controller 423 wants to calculate a touch input location using detection signals of two cycles, it may not perform the operation of step 530. In step 560, the controller 423 may calculate whether a touch input occurs and a touch input location using an adding value, an average value, or a weighted average value of the two detection signal values of steps 520 and 550.

Due to the above-described configuration and operation, the inventive concept may calculate a touch input value of the same level for touch input which occurs on a region where first electrodes are formed and for touch input which occurs on a region where second electrodes are formed. Therefore, sensitivity difference according to electrodes may be removed to improve the entire touch input sensitivity. Linearity may be improved to the entire enhance sensing performance of the touch sensing apparatus.

As such, the touch sensing apparatus may be configured and the touch sensing method may be performed according to an exemplary embodiment of the inventive concept. Meanwhile, while the inventive concept has been particularly shown and described with reference to exemplary embodiments thereof, it will be understood by those skilled in the art that various changes in form and details may be made therein without departing from the spirit and scope of the inventive concept as defined by the appended claims.

What is claimed is:

1. A touch sensing apparatus, comprising:
   a touch screen panel configured to include a plurality of first electrodes formed along a first direction and a plurality of second electrodes formed along a second direction intersecting the first direction; and
   a controller configured to sequentially apply a driving signal to the plurality of first electrodes or the plurality of second electrodes, to receive a detection signal from the plurality of second electrodes while applying the driving signal to the plurality of first electrodes, and to receive a detection signal from the plurality of first electrodes while applying the driving signal to the plurality of second electrodes,
   wherein the controller changes electrodes to which the driving signal is to be applied for each preset cycle of a touch sensing operation,
   wherein the controller applies the driving signal to each of the plurality of first electrodes twice or more during the preset cycle, and receives the detection signal from each of the plurality of second electrodes twice or more during the preset cycle,
   wherein the controller applies the driving signal to each of the plurality of second electrodes twice or more during a next cycle of the preset cycle, and receives the detection signal from each of the plurality of first electrodes twice or more during the next cycle.

2. The touch sensing apparatus of claim 1, wherein the controller calculates whether a touch input occurs and a touch input location using a detection signal from the plurality of first electrodes or the plurality of second electrodes for each cycle.

3. The touch sensing apparatus of claim 1, wherein the controller calculates whether a touch input occurs and a touch input location using detection signals from the plurality of first electrodes or the plurality of second electrodes of two cycles.

4. The touch sensing apparatus of claim 3, wherein the controller calculates whether a touch input occurs and a touch input location using an average value or a weighted average value of the detection signals from the plurality of first electrodes or the plurality of second electrodes of the two cycles.

5. The touch sensing apparatus of claim 1, further comprising:
   a first driving and sensing unit configured to apply a driving signal to the plurality of first electrodes or to receive a detection signal from the plurality of first electrodes according to an operation signal of the controller; and
   a second driving and sensing unit configured to apply a driving signal to the plurality of second electrodes or to receive a detection signal from the plurality of second electrodes according to an operation signal of the controller.

6. The touch sensing apparatus of claim 1, wherein the plurality of first electrodes and the plurality of second electrodes are formed of indium-tin-oxide (ITO), indium-zinc-oxide (IZO), metal mesh, graphene, silver nano wire, or carbon nano tube (CNT).

7. The touch sensing apparatus of claim 1, wherein the plurality of first electrodes and the plurality of second electrodes are formed on the same layer.

8. A touch sensing method, comprising:
   sequentially applying a driving signal to a plurality of first electrodes formed along a first direction twice or more during a preset first cycle and receiving a detection signal from a plurality of second electrodes formed along a second direction intersecting the first direction twice or more during the preset first cycle;
   determining whether a touch input occurs and a touch input location using the detection signal from the plurality of second electrodes;
   sequentially applying a driving signal to the plurality of second electrodes twice or more during a preset second cycle and receiving a detection signal from the plurality of first electrodes twice or more during the preset second cycle; and
   determining whether a touch input occurs and a touch input location using the detection signal from the plurality of first electrodes, wherein the preset second cycle follows the preset second cycle.

* * * * *